Figure 1:
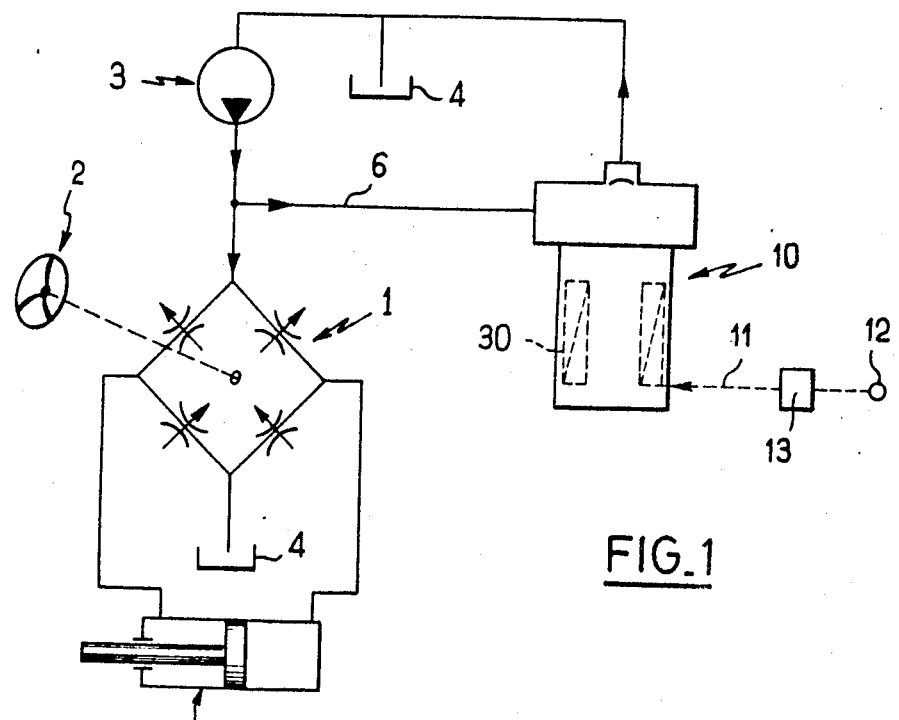

United States Patent [19]

Kervagoret

[11] Patent Number: 4,691,619
[45] Date of Patent: Sep. 8, 1987

[54] REGULATED DEVICE FOR CONTROLLING FLOW IN A HYDRAULIC INSTALLATION, PARTICULARLY FOR THE ASSISTED STEERING OF A VEHICLE

[75] Inventor: Gilbert Kervagoret, Argenteuil, France

[73] Assignee: Bendix France, Paris, France

[21] Appl. No.: 838,747

[22] Filed: Mar. 11, 1986

[30] Foreign Application Priority Data

Mar. 13, 1985 [FR] France .................. 85 03687

[51] Int. Cl.⁴ .................. F16K 31/12; B62D 5/06
[52] U.S. Cl. .................. 91/459; 137/501; 180/142
[58] Field of Search .................. 91/459, 446; 137/501; 251/129.14, 129.02, 129.15; 180/142

[56] References Cited

U.S. PATENT DOCUMENTS 2,807,144  9/1957  St Clair .................. 137/501 X

FOREIGN PATENT DOCUMENTS 0072732  2/1983  European Pat. Off. .
0089512  9/1983  European Pat. Off. .
2412337  10/1974  Fed. Rep. of Germany .
2207481  6/1974  France .
2275715  1/1976  France .

Primary Examiner—William E. Wayner
Attorney, Agent, or Firm—Larry J. Palguta; Ken C. Decker

[57] ABSTRACT

The device for controlling flow (10) situated in a branch hydraulic line (6), comprises a piston slide (15) sliding a bore (14) into which an inlet passage (36) and an outlet passage (20, 21) open, the slide forming with the outlet passage (21) a modulable restriction (s); the device comprsies a fluid passage between the inlet and outlet passages which includes a first portion (32, 33, 34), formed in the slide (15), and a second portion (19, 24, 23, 22) which is formed in the body (13) and is closed selectively by a spring biased (27) valve member (26) and the plunger (28) of an electromagnetic control member (9) piloted by an electrical signal which is a function of a significant parameter, for example the speed of a vehicle for the assisted steering of a vehicle.

6 Claims, 2 Drawing Figures

REGULATED DEVICE FOR CONTROLLING FLOW IN A HYDRAULIC INSTALLATION, PARTICULARLY FOR THE ASSISTED STEERING OF A VEHICLE

The present invention concerns regulated devices for controlling fluid in a hydraulic installation, particularly for the assisted steering of a vehicle, comprising a source of pressure the outlet of which is connected to a system for controlling a hydraulic actuator, the device being intended to be interposed in a branch hydraulic line between the outlet of the source of pressure and a reservoir, and including a body having a bore in which a modulating slide is slidably mounted which forms a modulable restriction between an inlet passage, which is intended to be connected to the outlet of the source, and an outlet passage, intended to be connected to the reservoir, both passages opening into the bore of the body, the position of the slide being determined by an electromagnetic control member as a function of an electrical control signal, for example as a function of the speed of the vehicle for an assisted steering system.

A regulated control device of this type is described in the document DE-A-2,412,337 which in fact concerns a regulated device for controlling the pressure supplied to the hydraulic actuator of an assisted steering system, in which the modulating slide is coupled mechanically to a plunger of the electromagnetic control member whose position, as a function of the electrical control signal, directly controls the position of the slide, which must be balanced by means of two springs and a passage passing through according to an arrangement requiring an accurate large magnetic field to be permanently exerted upon the control plunger of the slide and not protecting, pariculary as a function of fluctuations of the electrical control signal, against the risks of jerking the slide-plunger assembly thus subjecting the delicate components of this assembly to forces, that is to undesirable shocks which are capable of rapidly affecting proper operation.

One object of the present invention is to propose a regulated device for controlling bypassed flow in the branch line, according to a simple and robust arrangement, having a low inertia, in which the modulating slide is piloted hydraulically by means of a valve controlled by the electromagnetic control member.

To achieve this, according to a feature of the invention, the inlet passage includes a first portion which is formed in one end of the slide and which opens laterally facing a first end of a second portion which is formed in the body and thus the other end opens into a closed end of the bore, a valve controlled by the electromagnetic control member being interposed in said second portion of the inlet passage.

With such an arrangement, the (modulable) pressure gradient on both sides of the valve is applied to the two opposite surfaces of the slide, which acts as a piston in the bore, so as to position the slide without jerking and thus to determine accurately the (modulated) restriction of leakage without subjecting the slide/piston to shocks or mechanical forces.

Figure 2:
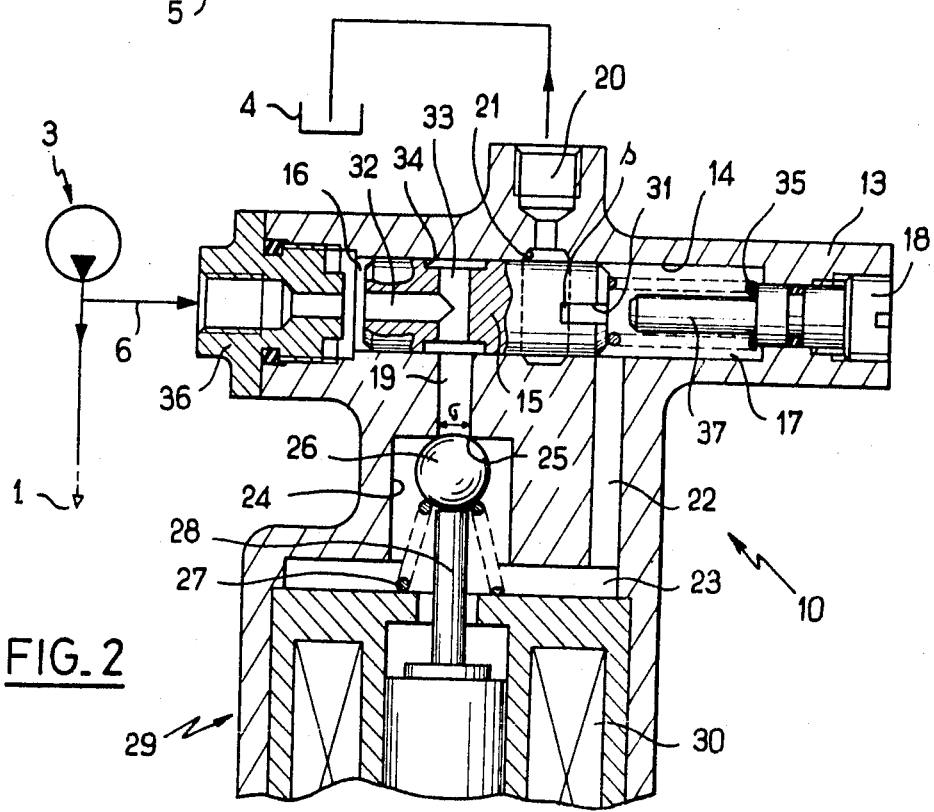

Other features and advantages of the present invention will appear from the following description of an embodiment, which is given by way of illustration but is not limiting in any way, with reference to the accompanying drawings, in which:

FIG. 1 is a general diagram of an assisted steering system equipped with a regulated device for controlling flow according to the invention; and FIG. 2 is a diagrammatic view in partial section of a device for controlling flow according to the invention.

The diagram of FIG. 1 shows an assisted steering system of a vehicle incorporating, in a manner which is in itself known, a distribution servo-value 1 which is actuated by the steering wheel 2 and is interposed between a source of fluid under pressure 3, generally equipped with an integral flow regulating device, and a reservoir 4, so as to supply selectively and alternatively the opposing chambers of a hydraulic actuator 5 for assisting with steering with fluid under pressure. In accordance with the invention, a device 10 is interposed in a branch hydraulic line 6 between the outlet of the source of pressure 3 and the reservoir 4, the device 10 controlling the flow bypassed in the branch hydraulic line 6 (and thus subtracted from the steering servo-valve 1) as a function of an electrical signal 11 derived from a sensor 12 providing a characteristic parameter, for example the speed of travel of the vehicle.

As shown in FIG. 2, the regulated device for controlling flow 10 according to the invention incorporates a body 13 having a bore 14 in which a piston 15 forming a distribution slide is mounted so as to be able to slide. The piston 15 thus divides the bore 14 into an inlet chamber 16, connected to the portion of the branch hydraulic line 6 coming from the source of pressure 3, and a rear chamber 17 which is closed by a plug 18. In the body 10 a passage 19 is formed which opens into the bore 14 on the same side as the inlet chamber 16, and an outlet passage 20 is formed, which is intended to be connected to the reservoir 4 and opens into the bore 14, on the same side as the rear chamber 17, through an annular groove 21. A passage 22 opens into the rear chamber 17, the passage 22 being formed in the body 10 parallel to the passage 19 and connected to the latter by a chamber 23, and one end of enlarged diameter 24 of the passage 19 being connected to the latter by a shoulder forming a seat 25 for a valve member, consisting in this case of a ball 26, biased against the seat 25 by a spring 27 bearing against the bottom of the chamber 23. The valve member 26 is also biased against its seat 25 by a plunger 28 of an electromagnetic control member 29 of the electromagnet type with constant gap the coil 30 of which receives the electrical signal 11 mentined above.

The piston-slide 15 incorporates at its rear end (defining the rear chamber 17) at least one longitudinal slot 31 which defines, with the annular outlet groove 21, a restriction s which is variable as a function of the position of the slide 15 relative to the annular groove 21. The piston-slide 15 incorporates at its front end (defining the inlet chamber 16) a longitudinal central bore 32 opening into the front surface of the slide and communicating internally with a transerse bore 33 which opens onto the periphery of the slide 15 through an annular groove 34 formed in the latter. A spring 35 pushing the slide 15 in the direction tending to reduce the volume of the inlet chamber 16 and to increase the passage of the restriction s. A connecting plug 36 defining the inlet chamber 16 towards the outside advantageously forms a front abutment for the slide 15 while a rear abutment 37 is provided in the rear chamber 17, formed advantageously of a rod which is formed in one single piece with the plug 18 and forms a guide bar for the spring 35. The axial dimension of the peripheral groove 34 is determined in such a way that it communicates permanently with the passage 19 which is selectively closed internally by the valve component 26.

The device operates as follows: let $\sigma$ be the cross-section of the seat 25, f be the calibration of the spring 27, $\varphi$ be the force supplied by the plunger 28 onto the valve component 26, $\pi$ be the pressure applied by the source of pressure 3 (and existing in the inlet chamber 16), and p be the pressure existing in the rear chamber 17; the opening pressure of the valve component 26 will then be determined by the following relation:

$$\pi - p = (f + \varphi)/\sigma$$

This pressure gradient $\pi - p$ is thus also applied onto the two opposite surfaces of the slide-piston 15, which tends to move it to the right (in FIG. 2) against the spring 35 and to give it a corresponding equilibrium position. A determined cross-section of the restriction s corresponds to each equilibrium position of the slide-piston 15. Thus a calibrated orifice s in the branch hydraulic line 6 corresponds to each value of force $\varphi$ applied by the electromechanical control component 29 onto the valve component 26. Typically, the force $\varphi$ is a function which is inversely proportional to the speed of the vehicle provided by the sensor 12, from which it follows that the assistance provided by the actuator 5 reduces when the speed of the vehicle increases. However, at low speed, the force $\varphi$ applied onto the valve component 26 is a maximum and the piston-slide 15 is held against the rear abutment 37, the restriction s being closed.

Although the invention has been described in relation to a particular embodiment, the invention is not limited by it but on the contrary is capable of modifications and variants which will be apparent to a person versed in the art. In particular a processing circuit 13 may provide an electrical control signal 11 derived from several significant parameters of the vehicle.

I claim:

1. A regulated device for controlling fluid in a hydraulic installation (1, 5), particularly for the assisted steering of a vehicle, comprising a source of pressure (3) through an outlet connected to a system for controlling (1) a hydraulic actuator (5), the device (10) being intended to be interposed in a branch hydraulic line (6) between the outlet of the source of pressure (3) and a reservoir (4) and incorporating a body (13) having a bore (14) in which a modulating slide (15) is slidingly mounted which forms a modulable restriction (s) between an inlet passage (32, 33, 19, 23, 22, 17), which is intended to be connected to the outlet of the source (3), and an outlet passage (20, 21), which is intended to be connected to the reservoir (4), both passages opening into the bore, (14) position of the slide (15) being determined as a function of an electrical control signal (11) by an electromagnetic control member (29), characterized in that the inlet passage includes a first portion, (32, 33) which is formed in one end of the slide (15) and opens laterally (34) facing a first end (19) of a second passage portion (19, 24, 23, 22) which is formed in the body and the other end (22) of which opens into a closed end (17) of the bore (14), a valve (26) controlled by the electro-magnetic control member (29) being interposed in said second passage portion.

2. Device according to claim 1, characterized in that the valve consists of a valve member (26) which is arranged in an enlargement (24) forming a seat (25) of the first end (19) of the said second passage portion and which is biased towards this seat by a spring (27) and by a plunger (28) of the electromagnetic control member (29).

3. Device according to claim 2, characterized in that it comprises, in the closed end of the bore (17), a spring (35) biasing the slide (15) in a direction tending to open the modulable restriction (s).

4. Device according to claim 3, characterized in that the modulable restriction (s) consists of an annular groove (21) in the bore (14), communicating with the outlet passage (20), and at least one slot (31) formed in the other end of the slide (15).

5. Device according to claim 4, characterized in that it comprises, in the closed end of the bore (17), an abutment means (37) limiting movement of the slide (15).

6. Device according to claim 5, characterized in that the first portion includes a longitudinal bore (32) and a transverse bore (33) formed in the slide (15), the transverse bore (33) opening into a peripheral annular groove (34) of the plunger (15).

* * * * *